(12) United States Patent
Liu

(10) Patent No.: US 9,195,300 B2
(45) Date of Patent: Nov. 24, 2015

(54) ELECTRONIC DEVICE CAPABLE OF SELECTING AND PLAYING FILES BASED ON FACIAL EXPRESSIONS AND METHOD THEREOF

(75) Inventor: Young-Way Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 504 days.

(21) Appl. No.: 13/329,229

(22) Filed: Dec. 17, 2011

(65) Prior Publication Data

US 2013/0077834 A1 Mar. 28, 2013

(51) Int. Cl.
| | |
|---|---|
| G06K 9/00 | (2006.01) |
| G06K 9/62 | (2006.01) |
| G06F 3/00 | (2006.01) |
| G06F 3/01 | (2006.01) |
| G06F 3/03 | (2006.01) |

(52) U.S. Cl.
CPC .............. G06F 3/005 (2013.01); G06F 3/011 (2013.01); G06F 3/0304 (2013.01); G06K 9/00255 (2013.01); G06K 9/00308 (2013.01)

(58) Field of Classification Search
USPC ......................................... 382/118, 155, 224
See application file for complete search history.

(56) References Cited

U.S. PATENT DOCUMENTS

| | | | |
|---|---|---|---|
| 7,593,576 B2* | 9/2009 | Meyer et al. .................. 382/190 |
| 7,885,433 B2* | 2/2011 | Yano et al. .................... 382/115 |
| 8,068,099 B2 | 11/2011 | Hsu et al. | |
| 8,094,891 B2 | 1/2012 | Andreasson | |
| 2008/0285791 A1* | 11/2008 | Suzuki et al. ................. 382/100 |
| 2009/0019117 A1* | 1/2009 | Bonforte et al. .............. 709/206 |
| 2009/0196466 A1* | 8/2009 | Capata et al. ................. 382/118 |
| 2010/0098341 A1* | 4/2010 | Ju et al. .......................... 382/209 |
| 2010/0177116 A1* | 7/2010 | Dahllof et al. ................ 345/619 |
| 2012/0036167 A1* | 2/2012 | Herrnstadt .................... 707/803 |
| 2012/0263357 A1* | 10/2012 | Xu et al. ....................... 382/128 |

FOREIGN PATENT DOCUMENTS

| | | |
|---|---|---|
| CN | 101674363 A | 3/2010 |
| TW | 200935865 A | 8/2009 |
| TW | M402934 | 5/2011 |
| TW | M402934 U1 | 5/2011 |

* cited by examiner

*Primary Examiner* — Kathleen Y Dulaney
(74) *Attorney, Agent, or Firm* — Novak Druce Connolly Bove + Quigg LLP

(57) ABSTRACT

An electronic device includes a storage unit, a capturing unit and a processing unit. The storage unit stores a plurality of files, and a relationship table between facial expressions and the plurality of files. The processing unit includes a controlling module, a facial image acquiring module, a facial expression identifying module, a file acquiring module and a file playing module. The controlling module controls the capturing unit to capture a predetermined number of facial images. The facial image acquiring module acquires a clear facial image from the predetermined number of facial images. The facial expression identifying module identifies a facial expression of the clear facial image. The file acquiring module identifies whether there is at least one of the files matching with the identified facial expression, and acquires the at least one matching file. The file playing module opens and/or plays the at least matching file.

14 Claims, 2 Drawing Sheets

ELECTRONIC DEVICE CAPABLE OF SELECTING AND PLAYING FILES BASED ON FACIAL EXPRESSIONS AND METHOD THEREOF

BACKGROUND

1. Technical Field

The present disclosure relates to electronic devices and, particularly, to an electronic device with the function of selecting and playing files based on recognition of a facial expression and a method thereof.

2. Description of Related Art

Electronic devices, such as notebook computers, can play different files in response to different user inputs. The result of playing the file is foreseeable, which may be no continuing novelty for users of the electronic device.

Therefore, what is needed is an electronic device with a function of selecting and playing files based on a facial expression to overcome the described limitations.

DETAILED DESCRIPTION

Figure 1:
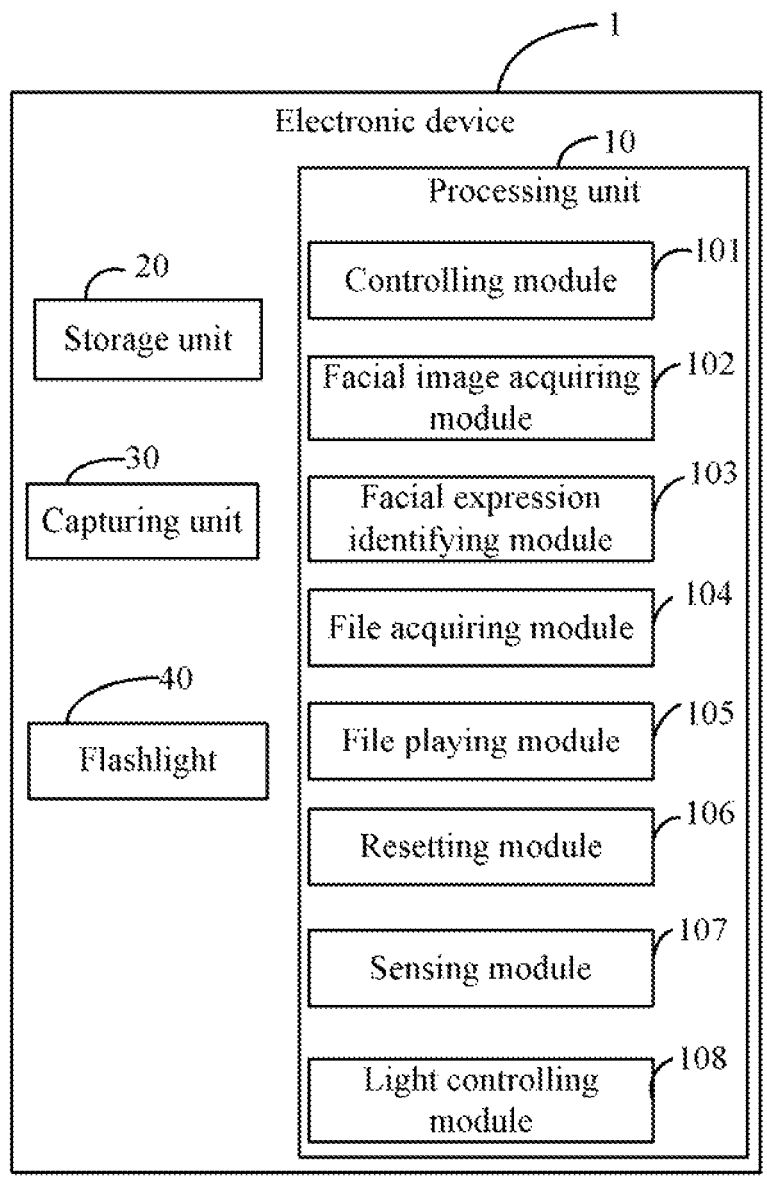
FIG. 1 is a block diagram of the hardware infrastructure of an electronic device capable of selecting and playing files based on recognition of a facial expression, in accordance with an exemplary embodiment.

FIG. 1 shows an electronic device 1 with the ability to select and play certain files corresponding to different facial expressions. The electronic device 1 includes a processing unit 10, a capturing unit 30, and a storage unit 20. The capturing unit 30 is configured to capture facial images. The storage unit 20 is configured to store a plurality of files, and a relationship table between facial expressions and the plurality of files. In one embodiment, the at least one file may be one or more appointed files or a number of files with one or more appointed file types. The file may be a video file, an audio file, or a still image file, or a combination thereof.

The processing unit 10 includes a controlling module 101, a facial image acquiring module 102, a facial expression identifying module 103, a file acquiring module 104, and a file playing module 105.

The controlling module 101 is configured to control the capturing unit 30 to capture a predetermined number of facial images at a preset time. The preset time may be the time when starting up the electronic device 1, for example. In one embodiment, the capturing unit 30 is a camera.

The facial image acquiring module 102 is configured to acquire one clear facial image from the predetermined number of facial images. In one embodiment, the facial image acquiring module 102 is configured to acquire a facial image having facial contours as the clear facial image.

The facial expression identifying module 103 is configured to identify the facial expression in the clear facial image. In one embodiment, the facial expression identifying module 103 is configured to analyze the facial characteristics of the clear facial image to identify the facial expression. The method for analyzing the facial characteristics of the clear facial image to identify the facial expression may include steps following: detecting the respective positions of a face, eyes, a nose, and a mouth in a facial image, converting the positions into a standard facial image, and determining whether the current positions match the positions in the standard facial image, if not, determining the difference(s) between the current positions and the positions in the standard facial image, and determining the facial expression according to the determined difference(s). In another embodiment, the facial expression identifying module 103 can use other technologies to identify the facial expression. The facial expression may include among others, happiness, sadness, and thoughtfulness.

The file acquiring module 104 is configured to identify whether there is at least one of the files matching with the identified facial expression in the storage unit 20 based on the relationship table, and acquire the at least one matching file when there is such at least one matching file. In one embodiment, the file acquiring module 104 is configured to acquire one or more appointed files matching the identified facial expression or a number of files of one or more appointed file types and randomly choose one file from the number of files of the one or more appointed file types.

The file playing module 105 is configured to open and/or play the acquired at least one matching file.

Furthermore, in one embodiment, the controlling module 101 is further configured to control the capturing unit 30 to capture the predetermined number of facial images again when the file acquiring module 104 identifies that there is no at least one of the files matching with the identified facial expression in the storage unit 20 based on the relationship table. In another embodiment, the file acquiring module 104 is further configured to generate a window for the user to set the at least one matching file for the identified facial expression when there is no at least one of the files matching with the identified facial expression in the storage unit 20 based on the relationship table. In another embodiment, the file acquiring module 104 is further configured to acquire files according to a predetermined rule when there is no at least one of the files matching with the identified facial expression in the storage unit 20 based on the relationship table. The predetermined rule may be that the file acquiring module 104 must acquire the at least one matching file directly associated with a well known facial expression which is similar to or opposite to the identified facial expression which has no the at least one matching file in the storage unit 20.

Furthermore, the processing unit 10 includes a resetting module 106. The resetting module 106 is configured to reset the relationship table between the facial expressions and the plurality of files.

Furthermore, the electronic device 1 includes a flashlight 40. The processing unit 10 further includes a sensing module 107 and a light controlling module 108. Immediately prior to the capture of the predetermined number of facial images by the capturing unit 30, the sensing module 107 is configured to sense the level of natural light, and the light controlling module 108 is configured to determine whether or not that the level is sufficient, and to turn on the flashlight 40 when the level of natural light is not sufficient.

Figure 2:
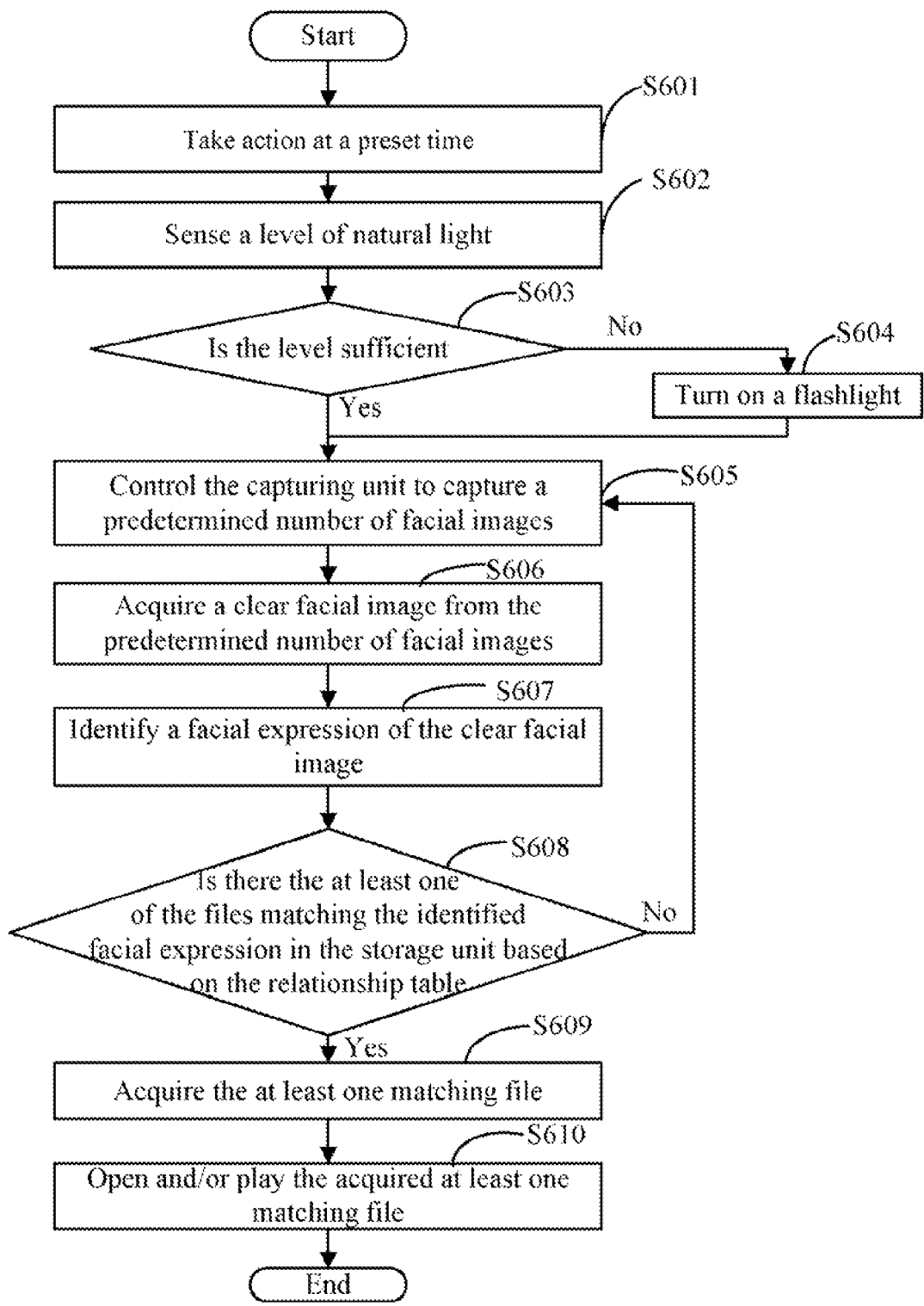
FIG. 2 is a flowchart of a method for selecting and playing files based on recognition of a facial expression implemented by the electronic device of FIG. 1, in accordance with an exemplary embodiment.

FIG. 2 is a flowchart of a method for selecting and playing files based on a facial expression as implemented by the electronic device of FIG. 1, in accordance with an exemplary embodiment.

In step S601, The controlling module 101 takes action based on the occurrence of a particular event or after the lapse of some predetermined time.

In step S602, the sensing module 107 senses the level of the natural light.

In step S603, the light controlling module 108 determines whether or not that the level of the natural light is sufficient, if it is sufficient, the procedure goes to step S604, if it is not, the procedure goes to step S605.

In step S604, the light controlling module 108 turns on the flashlight 40.

In step S605, the controlling module 101 controls the capturing unit 30 to capture the predetermined number of the facial images at a preset time.

In step S606, the facial image acquiring module 102 acquires a clear facial image from the predetermined number of the facial images.

In step S607, the facial expression identifying module 103 identifies the facial expression of the clear facial image.

In step S608, the file acquiring module 104 identifies whether there is at least one of the files matching with the identified facial expression in the storage unit based on the relationship table, if yes, the procedure goes to step S609, if no, the procedure goes to step S605.

In step S609, the file acquiring module 104 acquires the at least one matching file.

In step S610, the file playing module 105 opens and/or plays the acquired at least one matching file.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device for selecting and playing files based on a facial expression, comprising:
   a capturing unit configured to capture facial images;
   a storage unit configured to store a plurality of files, and a relationship table between facial expressions and the plurality of files; and
   a processing unit comprising:
      a controlling module configured to control the capturing unit to capture a predetermined number of facial images upon activation of the electronic device;
      a facial image acquiring module configured to acquire a clear facial image having facial contours from the predetermined number of facial images;
      a facial expression identifying module configured to identify a facial expression of the clear facial image;
      a file acquiring module configured to identify whether at least one of the files matches the identified facial expression in the storage unit based on the relationship table; wherein the at least one of the files matching the identified facial expression is at least one of a video file, an audio file, or a combination thereof;
      a file playing module configured to open and/or play the acquired at least one matching file; and
      upon determining that there is no file matching the identified facial expression in the storage unit based on the relationship table, the file acquiring module further configured to generate a window for a user to set at least one of the files for matching the identified facial expression in the storage unit.

2. The electronic device as described in claim 1, wherein the at least one file for matching the identified facial expression is one or more appointed files or a plurality of files with one or more appointed file types, the file acquiring module is further configured to acquire one or more appointed files or a plurality of files of the one or more appointed file types and randomly choose a file from the plurality of files of the one or more appointed file types.

3. The electronic device as described in claim 2, the controlling module is further configured to control the capturing unit to capture the predetermined number of facial images again when there is no file matching with the identified facial expression in the storage unit based on the relationship table.

4. The electronic device as described in claim 3, wherein the file acquiring module is further configured to acquire the at least one of the files for matching the identified facial expression in a predetermined rule when there is no file matching with the identified facial expression in the storage unit based on the relationship table.

5. The electronic device as described in claim 4, wherein the processing unit further comprises a resetting module, the resetting module is configured to reset the relationship table between the facial expressions and the plurality of files.

6. The electronic device as described in claim 5, wherein the facial expression identifying module is further configured to analyze facial characteristics of the facial image to identify the facial expression.

7. The electronic device as described in claim 6, further comprising a flashlight, wherein the processing unit further comprises a sensing module and a light controlling module, the sensing module is configured to sense a level of natural light before the capturing unit captures the facial images, the light controlling module is configured to determine whether the level of the natural light is sufficient, and to turn on the flashlight when the level of the natural light is not sufficient.

8. A method for playing files based on a facial expression implemented by an electronic device, wherein the electronic device comprises a capturing unit and a storage unit, the capturing unit is configured to capture facial images, and the storage unit is configured to store a plurality of files, and a relationship table between facial expressions and the plurality of files, the method comprising:
   controlling the capturing unit to capture a predetermined plurality of facial images upon activation of the electronic device;
   acquiring a clear facial image having facial contours from the predetermined number of facial images;
   identifying a facial expression of the clear facial image;
   identifying whether there is at least one of the files matches the identified facial expression in the storage unit based on the relationship table, wherein the at least one of the files matching the identified facial expression is at least one of a video file, an audio file, or a combination thereof;
   acquiring the at least one matching file when there is such at least one matching file;
   opening and/or playing the acquired at least one matching file; and
   generating a window for a user to set at least one of the files for matching the identified facial expression when there is no file matching with the identified facial expression in the storage unit based on the relationship table.

9. The method as described in claim 8, further comprising:
   controlling the capturing unit to capture the predetermined plurality of facial images again when there is no file matching with the identified facial expression in the storage unit based on the relationship table.

10. The method as described in claim 9, further comprising:
   acquiring the at least one of the files for matching the identified facial expression in a predetermined rule when there is no file matching with the identified facial expression in the storage unit based on the relationship table.

11. The method as described in claim 10, further comprising:
- resetting the relationship table between the facial expressions and the plurality of files.

12. The method as described in claim 11, wherein the method for identifying the facial expression comprises:
- analyzing facial characteristics of the facial image to identify the facial expression.

13. The method as described in claim 12, further comprising:
- sensing a level of a natural light before the capturing unit captures the facial images;
- determining whether the level of the natural light is sufficient; and
- turning on a flashlight when the level of the natural light is not sufficient.

14. The method as described in claim 13, wherein the at least one file set for matching the identified facial expression is one or more appointed files or a plurality of files of one or more appointed file types, the method for acquiring the at least one file for matching the identified facial expression comprising:
- acquiring the one or more appointed files or a plurality of files of the one or more appointed file types and randomly choose a file from the plurality of files of the one or more appointed file types.

* * * * *